United States Patent
Hicks et al.

(10) Patent No.: US 6,636,685 B2
(45) Date of Patent: Oct. 21, 2003

(54) SYSTEMS AND METHODS FOR FABRICATING FLEXIBLE OPTICAL FIBER CIRCUITS

(75) Inventors: Jeffrey Harrison Hicks, Lilburn, GA (US); Muhammed Afzal Shahid, Snellville, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/066,254

(22) Filed: Jan. 30, 2002

(65) Prior Publication Data

US 2003/0142949 A1 Jul. 31, 2003

(51) Int. Cl.[7] .................................................. G02B 6/00
(52) U.S. Cl. ......................... 385/147; 385/76; 385/137
(58) Field of Search ................................. 385/147, 135, 385/134, 137, 14, 76, 71, 49, 51, 52, 139

(56) References Cited

U.S. PATENT DOCUMENTS 5,259,051 A    11/1993   Burack et al. ................. 385/76
6,370,293 B1 * 4/2002   Emmerich et al. ............. 385/14
6,442,323 B1 * 8/2002   Sorosiak ....................... 385/137

* cited by examiner

Primary Examiner—Phan T. H. Palmer
(74) Attorney, Agent, or Firm—Sutherland Asbill & Brennan LLP

(57) ABSTRACT

A method for fabricating flexible optical fiber circuits, including routing optical fiber on a flexible substrate according to a predetermined pattern using an optical fiber routing head, wherein routing the optical fiber includes routing at least one non-disposable optical fiber portion and least one disposable test pattern. A cutting head is aligned to cut adjacent at least one segment of the non-disposable optical fiber portion based upon the accuracy with which the cutting head cuts adjacent to the test pattern. Using the test patterns avoids alignment errors that may otherwise occur during the cutting of the optical fiber circuit which can result in a total loss of the optical fiber substrate.

11 Claims, 6 Drawing Sheets

SYSTEMS AND METHODS FOR FABRICATING FLEXIBLE OPTICAL FIBER CIRCUITS

FIELD OF THE INVENTION

The present invention relates to optical circuits and, more particularly, to systems and methods for fabricating refined flexible optical fiber circuits.

BACKGROUND OF THE INVENTION

High capacity electronic systems are increasingly adopting optoelectronics as a means to surpass conventional limitations (e.g., transmission speed) of electrical interconnections. Although photonic technology has long been preferred in long-haul communications, optics is now quickly becoming a viable option for short link applications. One demanding short-link application for optical interconnection is in the interboard/shelf or backplane level of communication. Most large system equipment today is partitioned into bookshelf levels consisting of multiple printed wiring boards inserted into shelves within a frame or cabinet. One interconnect level within such a system is that between two printed circuit boards within the cabinet, known as the backplane level of interconnection.

Backplane systems are typically organized by mounting various system components on printed wiring boards and interconnecting the printed wiring boards with a circuit transmission element known as a backplane. The backplane may include various socket elements for receiving printed wiring boards. However, as the circuit density of printed wiring boards increases, it becomes difficult to provide the needed backplane interconnections because, as interconnection transmission lines become thinner, their impedances increase. Furthermore, electromagnetic interference between closely adjacent electrical signal parts can reduce signal integrity due to cross-talk and interference. Additionally, the distance over which information must be transmitted by backplane conductors is fairly long compared to the distances transmitted on printed wiring boards. These factors may reduce the speed at which the circuits can be operated, and the signal integrity, which may defeat a principal advantage of higher circuit densities. Optical fiber interconnections have been suggested to address these problems.

Recently, convenient and manufacturable methods of linking components at the backplane level via optical fiber interconnections have been suggested which may result in a number of advantages, including down-sized wiring closets, fewer cumbersome cables through management of connections, low loss distribution, and low cost. These optical fiber interconnections are often made of flexible material so that they can be bent for mounting in an appropriate structure to reduce the volume required by the system and to aid in connection to other electronic systems. Although advances in optical fiber J interconnections will be discussed with focus on implementation at the backplane level, these interconnections can be utilized in a number of short link applications other than simply those used as backplane connections within a large system cabinet.

U.S. Pat. No. 5,259,051, to Burack et al. (hereinafter Burack et al. '051), assigned to AT&T Bell Laboratories, the predecessor in interest of the assignee of the present invention, which is incorporated herein by reference, describes a method for making optical circuits for use as backplanes by using a robotic routing machine to apply optical fiber to the flat surface of a flexible substrate that may be used as a backplane. The flexible substrate upon which optical fiber is routed is fastened or mounted onto a fixed backboard, or carrier plate, which provides support to the flexible substrate as a robotic machine routes and places optical fiber thereon. The routing machine of Burack et al. '051 includes an elongated manipulator having a vertical axis and a wheel on the end thereof for applying optical fiber to the backboard-mounted flexible substrate. Attached to the vertical axis is a reel of optical fiber to be routed onto the flexible substrate. The vertical axis can be controlled to move in a plurality of directions, including in a rotatable direction around its axis, so that it can apply fibers to any portion of the substrate. As the vertical axis moves around the substrate, a continuous line of optical fiber is fed to the wheel on the end of the vertical axis, and deposited onto the flexible substrate. A controller operates the manipulator to achieve a desired pattern of optical fiber placed on the substrate. The layout of the optical circuit is preferably designed by a computer, which provides optical fiber routes of the appropriate length between input and output ports of the flexible substrate. Robotic routing machines are preferably utilized to implement these routes because it is often important for optical transmission reliability that there not be undesirable deviations in the prescribed length of each line.

While the methods and apparatuses of the Burack et al. '051 patent have been implemented with great success, the creation of flexible optical fiber circuits using such a device results in lesser yield than is preferred because optical fibers are often cut by the robotic routing machine during the final stage of fabrication, which is the cutting of the final shape of the optical circuit. Because many customers demand optical circuits having narrow circuit tabs and precise substrate shapes, the creation and adherence to tight thresholds often results in the inadvertent cutting of an optical fiber, thus destroying the entire flexible optical circuit. This inadvertent cutting is often due to minor changes in the position of a substrate during different processing steps performed by the robotic routing machine. One reason for the problem is that it is often impossible to determine that an error exists in alignment until an optical fiber has already been cut and the circuit destroyed.

Accordingly, there is a continuing need for methods and systems that maximize fabrication yield of flexible optical fiber circuits using of robotic routing machines.

SUMMARY OF THE INVENTION

The present invention uses one or more optical fiber test patterns routed on a substrate to ensure that a robotic routing and cutting machine is properly aligned before the routing machine makes precise cuts very close to optical fiber placed on a substrate by the machine. Using the test patterns avoids alignment errors that may otherwise occur during the cutting of the optical fiber circuit which can result in a total loss of the optical fiber substrate.

According to one embodiment of the invention there is disclosed a method for fabricating flexible optical fiber circuits. The method comprises routing optical fiber on a flexible substrate according to a predetermined pattern using an optical fiber routing head, wherein routing the optical fiber includes routing at least one non-disposable optical fiber portion and least one disposable optical fiber portion. The method also comprises aligning a cutting head to cut adjacent the non-disposable optical fiber portion, wherein aligning the cutting tool is based upon the accuracy with which the cutting head cuts adjacent to the disposable optical fiber portion.

According to one aspect of the invention, the at least one disposable optical fiber portion comprises at least one test pattern. According to another aspect of the invention, the at least one disposable optical fiber portion is continuous with respect to the at least one non-disposable optical fiber portion. According to yet another aspect of the invention, the flexible substrate is perforated prior to routing optical fiber on the flexible substrate, and an adhesive may be provided on a surface of the flexible substrate prior to routing the fiber on the substrate. Additionally, the optical fiber may be coated on the flexible substrate using a conformal coating. Moreover, after the cutting head is aligned, a cut may be made adjacent the non-disposable optical fiber portion to fabricate the flexible optical fiber circuit.

According to another embodiment of the invention, there is disclosed a system for fabricating flexible optical fiber circuits. The system includes at least one flexible substrate, and optical fiber routed on the at least one substrate, wherein the optical fiber includes at least one non-disposable portion and at least one disposable portion, and wherein the at least one disposable portion includes one optical fiber test pattern. The system further includes a routing machine, comprising a cutting tool configurable to cut the at least one flexible substrate to fabricate a flexible optical fiber circuit, wherein the at least one routing machine utilizes the at least one optical fiber test pattern to align the cutting tool with respect the at least one non-disposable portion of the optical fiber.

According to one aspect of the invention, the system further comprises at least one aligning post for aligning the at least one flexible substrate with respect to the routing machine. Additionally, the routing machine may further include a control unit, wherein the control unit automates the movement of the cutting tool. According to another aspect of the invention, the optical fiber test pattern is continuous with the at least one non-disposable portion.

Other features and advantages of the present invention will become apparent to one skilled in the art upon examination of the following drawings and detailed description. It is intended that all such features and advantages be included herein within the scope of the present invention as defined by the appended claims.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
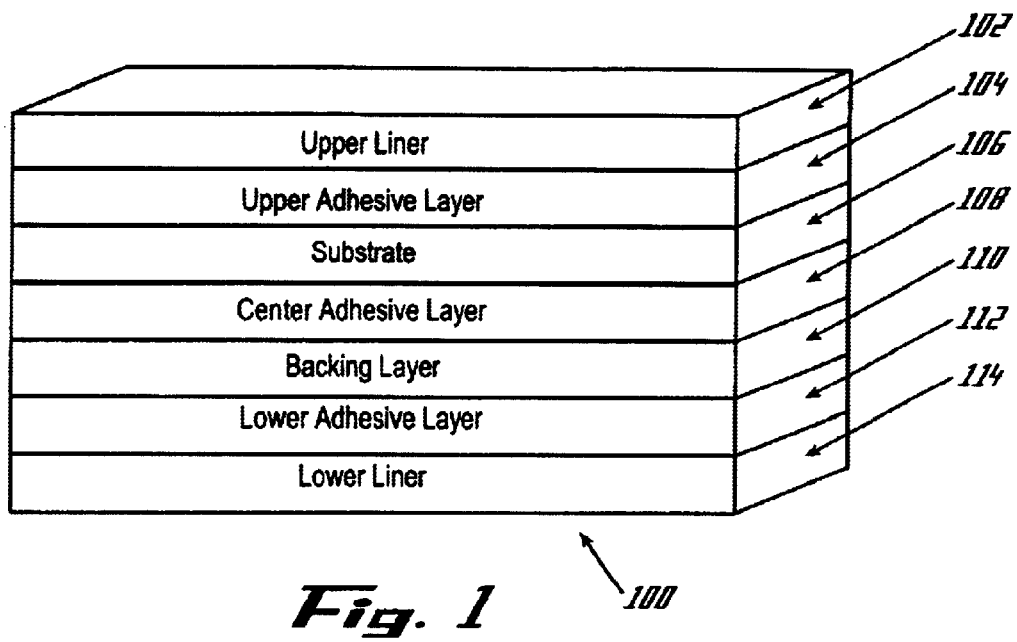
FIG. 1 shows the layers of a substrate structure upon which optical fiber is routed, according to one embodiment of the present invention.

FIG. 1 shows the layers of a substrate structure 100 upon which optical fiber is routed, according to one embodiment of the present invention. The substrate structure 100 is preferably flexible and includes a plurality of layers sandwiched between an upper liner 102 and a lower liner 114. The primary purpose of the upper and lower liners 102, 114 is to provide protection from upper and lower adhesive layers 104, 112 located directly adjacent the liners 102, 114 during handling of the substrate structure 100. The adhesive layers 104, 112 may comprise a silicone adhesive, an acrylic adhesive, a rubber based adhesive, a pressure sensitive adhesive, combinations thereof, or other suitable adhesives well known to those of skill in the art. The liner may comprise any flexible plastic material that prevents the upper and lower adhesive layers 104, 112 from making the substrate structure 100 tacky and thus difficult to handle.

A substrate 106 and backing layer are located in a central portion of the substrate structure 100, and are separated by a center adhesive layer 108. Each of the adhesive layers 104, 108, 112 may be a tacky adhesive, a pressure-sensitive adhesive, heat-sensitive adhesive, or the like, rolled or sprayed onto one or more adjacent layers within the substrate structure 100. According to one aspect of the invention, the substrate 106 is sandwiched between the upper surface of the center adhesive layer 108 and the lower surface of the upper adhesive layer 104. The backing layer is sandwiched between the lower surface of the center adhesive layer 108 and the upper surface of the lower adhesive layer 112. The substrate 106 is generally a flexible plastic substrate to which one or more optical fibers are to be adhered by the upper adhesive layer 104 after removal of the upper liner 102. Preferably, the substrate 106 comprises a polyimide material, such as KAPTON (a registered trademark of E. I. du Pont de Nemours and Company). The backing layer 110 may be made of the same or similar material. As described in detail below, and in the aforementioned Burack et al. patent, '051, the optical fibers may be placed on the substrate 106 surface by a computer-controlled routing machine.

Figure 2:
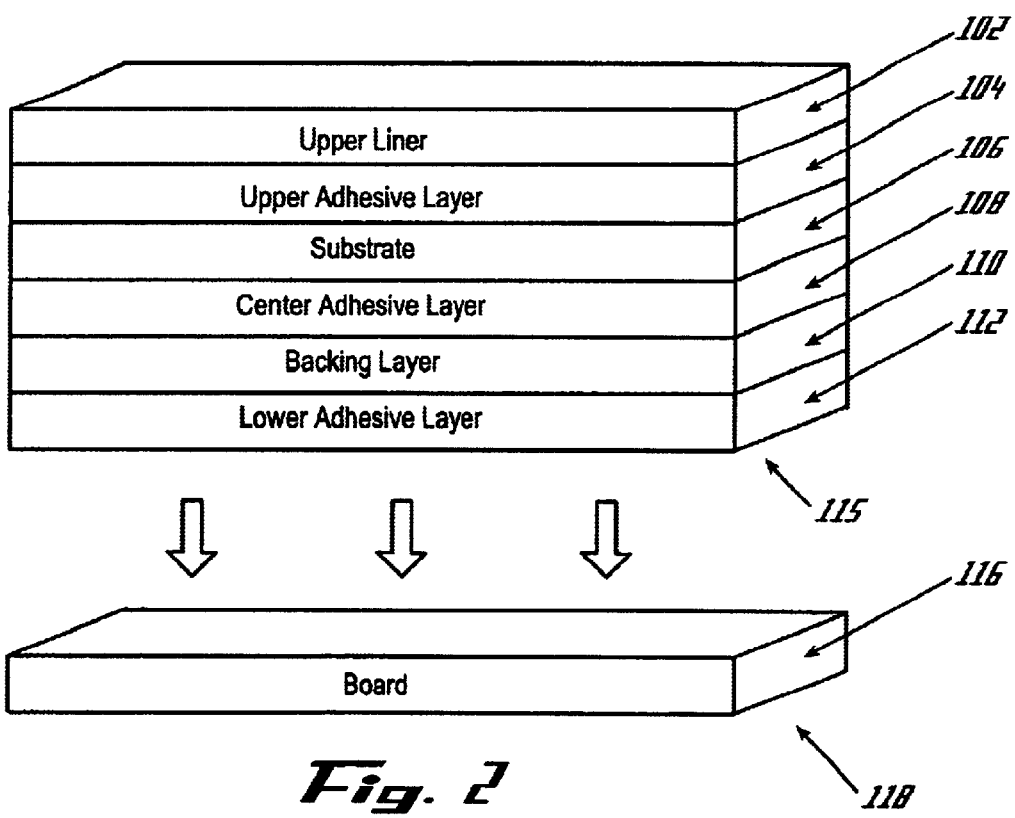
FIG. 2 shows the placement of the substrate structure of FIG. 1 on a board, according to one aspect of the present invention.

FIG. 2 shows the placement of the substrate structure 100 of FIG. 1 on a planar board 116, according to one aspect of the present invention. The board 116 provides support to the substrate structure during fabrication of the flexible optical fiber circuit. As illustrated in FIG. 2, the lower liner 114 is removed from the substrate structure 100, exposing the lower adhesive layer 112. The resulting substrate structure 115 (the substrate structure 100 of FIG. 1 minus the lower liner 114) is then placed on a board 116, as indicated by the arrows shown in FIG. 2, which may be a carrier board. Because the lower liner 114 is removed, the lower adhesive layer 112 comes into direct contact with the board 116. The placement of the substrate structure 115 on the board 116 may be accomplished by hand or by machine. According to a preferred embodiment of the invention, the substrate structure 115 is affixed to the board 116 using a laminating machine that heats the substrate structure 115 and/or board 116 such that the lower adhesive layer 112 securely bonds with the upper surface of the board 116. According to another embodiment of the invention, an additional tacky material or adhesive may also be added to the board 116 to aid in the board's 116 secure attachment to the substrate structure 115. The combined substrate structure 115 and board 116 are thus combined to form a boarded substrate structure 118.

Figure 3:
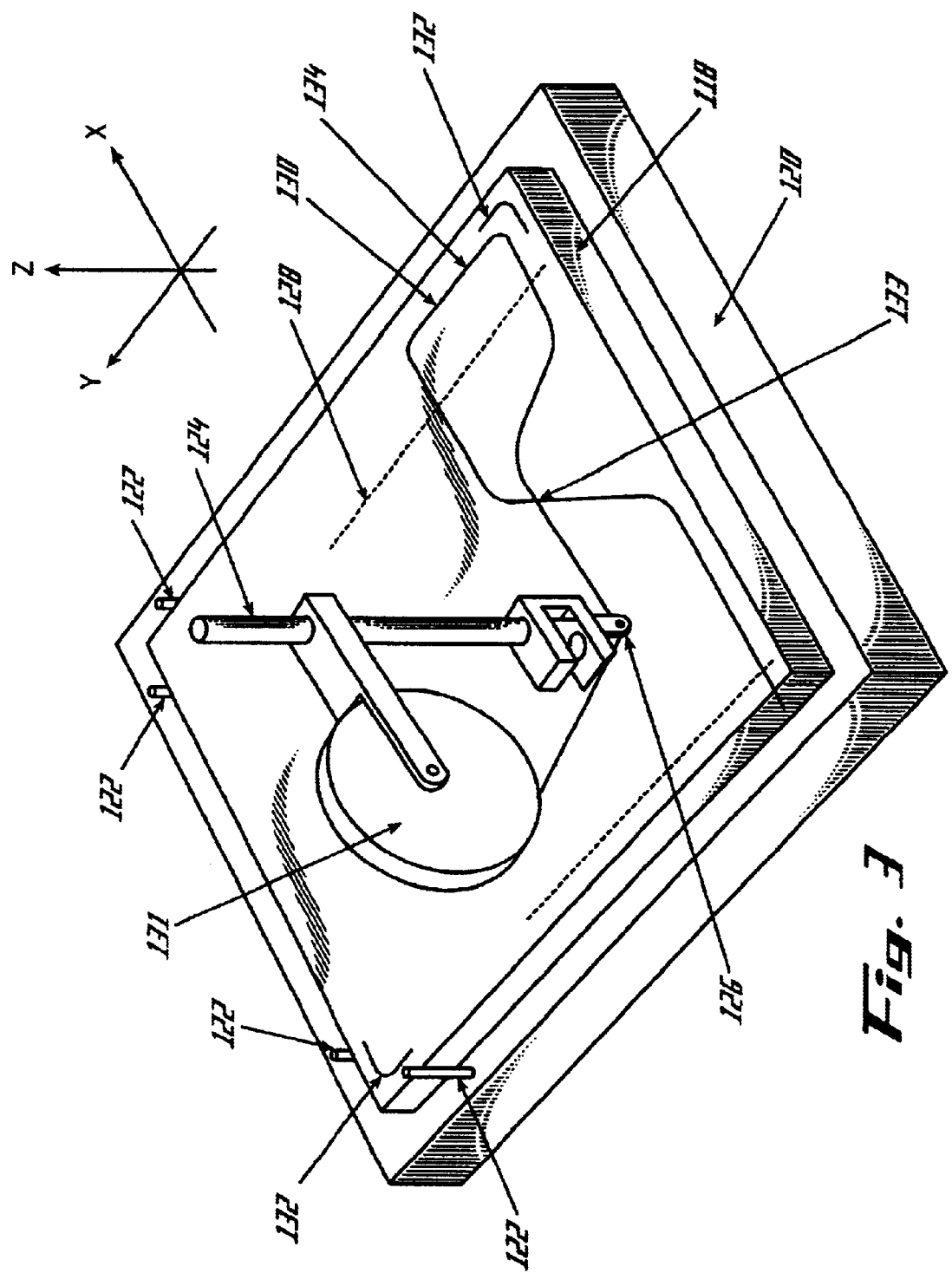
FIG. 3 shows the substrate and carrier board of FIG. 2 placed upon a routing machine surface and receiving optical fiber routed thereon, according to one embodiment of the present invention.

After adhering the substrate structure 115 to the board 116 the boarded substrate structure 118 is placed on the routing machine surface 120, as illustrated in FIG. 3. More specifically, FIG. 3 shows the boarded substrate structure 118 of FIG. 2 placed upon a routing machine surface 120 for receiving optical fiber routed thereon, according to one embodiment of the present invention: The routing machine surface 120 includes a plurality of stopping posts 122 for aligning the boarded substrate structure 118 in a predetermined position on the routing machine surface 120 such that the routing machine 124 may be aligned with respect to the boarded substrate structure 118. According to one preferred aspect of the present invention the stopping posts 122 abut multiple sides of the boarded substrate structure 118 when the boarded substrate structure 118 is placed on the routing machine surface 120 such that a plurality of identically sized boarded substrate structures may be fixed in the same position relative to the routing machine 124 each time the boarded substrate structures 118 are placed on the routing machine surface 120. Preferably the stopping posts 122 are located on three sides of the boarded substrate structure 118, as illustrated in FIG. 3.

One or more stopping posts 122 may be removably placed on or in four sides of the routing machine surface 120 so that posts 122 may be added to abut at least one side of the boarded substrate structure 118 after it is aligned with the other stopping posts 122 used to line up the boarded substrate structure 118 with the routing machine 124. According to one aspect of the invention the stopping posts 122 are metal, wood, or hard plastic rods or pins that are inserted into holes located at fixed positions in the routing machine surface 120. It will be appreciated, however, that virtually any removable stopping structures, such as blocks of material affixed to the routing machine surface 120, may be used. For instance, according to one alternative embodiment of the present invention, four stopping posts may be used, each shaped with a 90 degree inside angle facing one of the four corners of the boarded substrate structure 118 such that the boarded substrate structure 118 does not move with respect to the routing machine surface 120. Moreover, it will be appreciated by those of ordinary skill in the art that additional materials and constructions may be used.

After the boarded substrate structure 118 is fixed in position on the routing machine surface 120, the routing machine 124 may be used to perform multiple tasks associated with the formation of a flexible optical circuit from the boarded substrate structure 118. As illustrated in FIG. 3, the routing machine 124 includes a removable head 126 and a rotatable wheel 131 mounted on the side of the routing machine 124. The routing machine is capable of moving in the X-Y plane of the surface of boarded substrate structure 118, moving in the Z or -Z direction within the X-Y plane, and rotating about a central vertical axis. The replaceable head 126 is the routing machine element responsible for contacting the boarded substrate structure 118, and for routing optical fiber on the boarded substrate structure 118, as will be described in detail below. To perform these and other functions the replaceable head may comprise one or more knives, rollers, or spray nozzles.

According to one embodiment of the present invention, the routing machine 124 is initially used to pre-cut the boarded substrate structure 118. The structure 118 is pre-cut according to a pre-cut program controlling the movement of the routing machine 124 such that the pre-cut establishes, at least in part, the shape of a flexible optical circuit formed from the boarded substrate structure 118. According to a preferred aspect of the invention the pre-cut file is used to establish the exterior lines of the flexible optical circuit that intersect or run underneath optical fibers that are later routed on the boarded substrate structure, as will be described in greater detail below. The routing machine 124 is capable of cutting a pattern according to a pre-cut program because the routing machine 124 is controlled by a computer control unit that enables the routing machine 124 to make precise movements and repeat those precise movements each time a program (e.g., pre-cut program or fiber-routing program) is executed by the computer. For the purpose of the present disclosure it is sufficient that the computer may include multiple programs for guiding the routing machine 124 as the routing machine 124 cuts the boarded substrate structure 118, places optical fiber on the structure, spray coats the boarded substrate structure 118, or performs additional automated tasks associated with the fabrication of a flexible optical fiber circuit. Details of the computer control unit are described in detail in the Burack et al. patent, referenced above.

Referring again to pre-cutting of the boarded substrate structure 118, pre-cutting requires that the replaceable head 126 comprises a cutting head. The primary purpose of the pre-cut is to establish one or more edges of the flexible optical substrate across which optical fiber will be placed. As is illustrated in FIG. 3, the dotted line 128 on the boarded substrate structure 118 represents a pre-cut executed by the routing machine 124. Therefore, in the illustrative example of FIG. 3, the circuit body (not including circuit tabs) of the optical fiber substrate constructed from the boarded substrate structure 118 will be located within the pre-cut. According to one aspect of the invention, the pre-cut only perforates the boarded substrate structure 118, so that the pre-cut doesn't result in immediate separation of one portion of the boarded substrate structure 118 from another portion of the boarded substrate structure 118. As will be appreciated with reference to FIG. 6, the pre-cut allows for the termination of circuit tabs over which optical fiber is routed. According to another aspect of the invention, the pre-cut may only cut partially through the boarded substrate structure 118. For instance, a sharp edge of the pre-cut cutting head may only cut down to the center adhesive layer 108, such that the baking layer 110 is not cut during the pre-cut process. The pre-cut is discussed in greater detail with reference to FIGS. 5 and 6.

After completion of the pre-cut, the routing machine 124 is configured to route optical fiber on the boarded substrate structure 118. This configuration requires the replaceable head 126 to comprise an optical fiber routing head, and requires an optical fiber routing program to guide the movement of the routing machine 124. Prior to routing the optical fiber on the boarded substrate structure 118, the upper liner 102 is removed to expose the upper adhesive layer 104, upon which optical fiber is placed. The tackiness of the upper adhesive layer 104 holds the optical fiber after it is routed on the upper adhesive layer 104. The upper liner 102 may be removed after the pre-cut, and before the routing of the optical fiber. However, it will also be appreciated that the upper liner 102 may be removed prior to the pre-cut, which may serve to minimize any possible disturbance of the boarded substrate structure 118 after it is placed on the routing machine surface 120. Minimum disturbance of the board after placement is crucial because the optical fiber should be routed only in a precise relationship (or alignment) with respect to the pre-cut. Therefore it is preferred that the upper liner 102 be removed prior to the pre-cut.

As illustrated in FIG. 3, the replaceable head 126 can comprise an optical fiber routing head or wheel over which optical fiber 130 is threaded. The optical fiber 130 may be maintained on a spool 131 connected to the routing machine 124, or may be provided by one or more spools or like elements that provide optical thread to the routing head without negatively impacting the precise movement of the routing machine 124. After the optical fiber 130 is threaded around the optical fiber routing head the optical fiber routing head is pressed against the upper adhesive layer 104. The routing machine 124 then moves parallel to the upper adhesive layer 104, and as it moves, friction causes the optical fiber routing head (or wheel) to rotate, which exerts tension on optical fiber 130, causing the spool 131 to rotate. In this manner, as the routing machine is moved, optical fiber 130 is fed from the spool 131 to the routing head for adherence to the upper adhesive layer 104. As previously indicated, the routing machine 124 is rotatable in a direction around its central axis, which causes the routing head and spool 131 to turn in the direction of rotation. However, the change of direction should be sufficiently gradual to avoid undue stress on the optical fiber 130.

Because-the spool 131 is freely rotatable, the tension exerted on optical fiber 130 is not sufficient to damage it. That is, the tension is accommodated by the rotation of the spool 131 which unwinds optical fiber 130 from the spool 131. According to one aspect of the invention, the optical fiber routing head can include a spring that permits vertical movement to accommodate areas of crossover of optical fiber 133 without unduly stressing the optical fiber 130. Such a routing apparatus can be implemented with commercially available robotic apparatuses, such as with a manipulator of an FWS-50 flexible robotic workstation, a product of AT&T; a similar product is commercially available from the Megamation Company of Princeton, N.J.

As with the pre-cut, the routing of optical fiber 130 is controlled by the control unit, which can include hardware, such as a computer, or software, in electrical communication with the routing machine 124 for directing the machine's movement to achieve a desired optical fiber pattern. The control unit places the optical fiber 130 in a desired pattern based upon routing information received by the control unit. The routing information can include a routing software program (also referred to as a routing program or routing file) developed by a designer to achieve a particular circuit pattern, or conditions input into the control unit, such as locations of optical fiber 130 at specific locations on the upper adhesive layer of the combined substrate. Because optical fiber 130 is often deposited directly adjacent to itself or adjacent another optical fiber 130, and because optical fiber 130 is typically two hundred fifty microns or one hundred twenty-five microns in diameter, the control unit must be able to precisely move the routing machine. Furthermore, the control unit must be able to raise and lower the vertical axis of the routing machine 124 to apply sufficient force to cause the optical fiber 130 to adhere to the upper adhesive layer 104, but without damaging the optical fiber 130, which may be constructed of fragile plastic or glass.

FIG. 3 shows the a continuous pattern of optical fiber 130 placed on the upper adhesive layer of the boarded substrate structure 118. FIG. 3 also shows two L-shaped test patterns 132 at opposite corners of the boarded substrate structure 118. According to one preferred aspect of the present invention, the test patterns 132 are constructed of optical fiber placed on the structure 118 by the routing machine 124 and provided by the spool 131. However, because the test patterns 132 are illustrated as separate from the continuous optical fiber 130 illustrated in FIG. 3, optical fiber provided by the spool 131 must be cut to generate separate test patterns 132 constructed of optical fiber. This cut may be performed by the replaceable head or by hand. Alternatively, according to another aspect of the present invention, the test patterns 132 may be constructed of optical fiber that is continuous with optical fiber routed in creating the flexible optical fiber substrate. For instance, an unused portion of the optical fiber 130 routed to generate the flexible optical fiber circuit, such as a corner portion 134 (where such corner is not necessary to create the desired optical fiber circuit pattern), may be used as a test pattern.

The test patterns 132 allow the circuit board to be removed from the routing machine surface 120 for one or more circuit-formation processing steps, and then placed on the routing machine surface 120 a second time for one or more finishing steps performed by the routing machine 124, as will be explained in detail below. Because the finishing steps include making a final and precise cut around the optical fibers 130 to generate the final shape of the flexible optical circuit, without the test patterns 132 any such final cut must be performed using the main body of the optical fiber circuit to be manufactured. Thus, where the boarded substrate structure 118 is removed from the routing machine surface 120 and replaced on the surface 120, a misalignment may result in the inadvertent cutting of the optical fiber 130, thus destroying the entire flexible optical circuit.

The purpose of the test patterns 132 is to avoid the risk associated with cutting optical fibers of the flexible optical circuit after the boarded substrate structure 118 is remounted on the routing machine surface 120. Therefore, after the boarded substrate structure 118 is replaced on the routing machine surface, any cutting (or other action) that is performed on the structure 118 is initially performed on the test patterns 132, rather than on the optical fiber 130 that will ultimately comprise the finished flexible optical fiber substrate. The test patterns 132 enable an operator of the routing machine 124 to adjust the routing machine 124 for misalignment of the structure 118 on the routing machine surface 120 because the location (X,Y) of the removable head 126 with respect to the test patterns 132 may be measured. This is explained in greater detail below with reference to FIGS. 5 and 6. It should be appreciated that the test patterns 132 ensure that the routing machine 124 is in proper orientation with respect to the boarded substrate structure 118 despite the fact that the stopping posts 122 are designed to align the boarded substrate structure 118 with respect to the routing machine surface 120. This redundancy is necessary because the location error threshold for the routing machine is very minimal, in some situations less than ¼ of a millimeter in either the X or Y direction. Because the boarded substrate structure 118 may become slightly deform or dented by the stopping posts upon replacement on the routing machine surface, the test patterns 132 ensure correct placement of the boarded substrate structure on the routing machine surface 120.

Although multiple test patterns 132 are illustrated in FIG. 3, it should be appreciated by those of ordinary skill in the art that a single test pattern may be used, so long as the test pattern includes a marker or pattern at least partially oriented in both the X and Y directions. Similarly, multiple test patterns may be used, so long as the combination of test patterns include at least one marker or pattern oriented at least partially in the X direction and in the Y direction. This is preferred because the orientation of the boarded substrate structure 118 may be displaced in the X or Y direction upon being replacement on the routing machine surface 120. Therefore, testing the routing machine's alignment with respect to the boarded substrate structure 118 requires testing the routing machine's position with respect to the test patterns in both the X and Y coordinates.

As previously noted, the purpose of the test patterns 132 is to ensure the proper orientation of the boarded substrate structure 118 on the routing machine surface 120 after the boarded substrate structure 118 is removed from the surface 120 and replaced on the surface 120. The primary reason for removing the structure 118 from the surface 120 is so that the boarded substrate structure can be sprayed with an adhesive prior to the final shape of the flexible optical circuit is cut. The adhesive protects the optical fibers and prevents the optical fibers from moving from the position in which they are placed by the routing machine 124. According to one aspect of the invention, after optical fibers 130 are routed on the boarded substrate structure, the boarded substrate structure 118 is removed from the routing machine surface 120 and placed on the surface of a coating machine. The coating machine is similar to the routing machine 124 but is configured to apply a conformal coating on the boarded substrate structure 118. Like the routing of the optical fiber, the application of the conformal coating is controlled by the control unit, which can include hardware, such as a computer, or software, in electrical communication with the coating machine for directing the machine's movement to achieve a desired optical fiber pattern. The control unit sprays the conformal coating material in a desired pattern based upon coating information received by the control unit. The coating information can include a coating software program developed by a designer to achieve a particular coating pattern. The conformal coating may be applied as a continuous layer of liquid film, such as a silicone-based material, which is spray coated onto the optical fiber 130. Upon drying the material forms a continuous film.

After application of the conformal coating, the boarded substrate structure 118 having the conformal layer applied thereon is placed on the routing machine surface so that a final cut can be made to remove excess portions of the boarded substrate structure and to form the final shape of the flexible optical circuit. The ultimate shape of the circuit may be determined by computer, by a purchaser of the flexible optical circuit, or both. To cut the final shape of the flexible optical fiber circuit a post-cut file is used to control the routing machine 124. The post-cut is preferably created with the optical fiber routing file, and cuts the boarded substrate structure very close to the routed optical circuit. Therefore, the post-cut file uses the test patterns to evaluate the accuracy of the cut prior to the cutting of portions of the boarded substrate structure ultimately forming the flexible circuit board.

Figure 4:
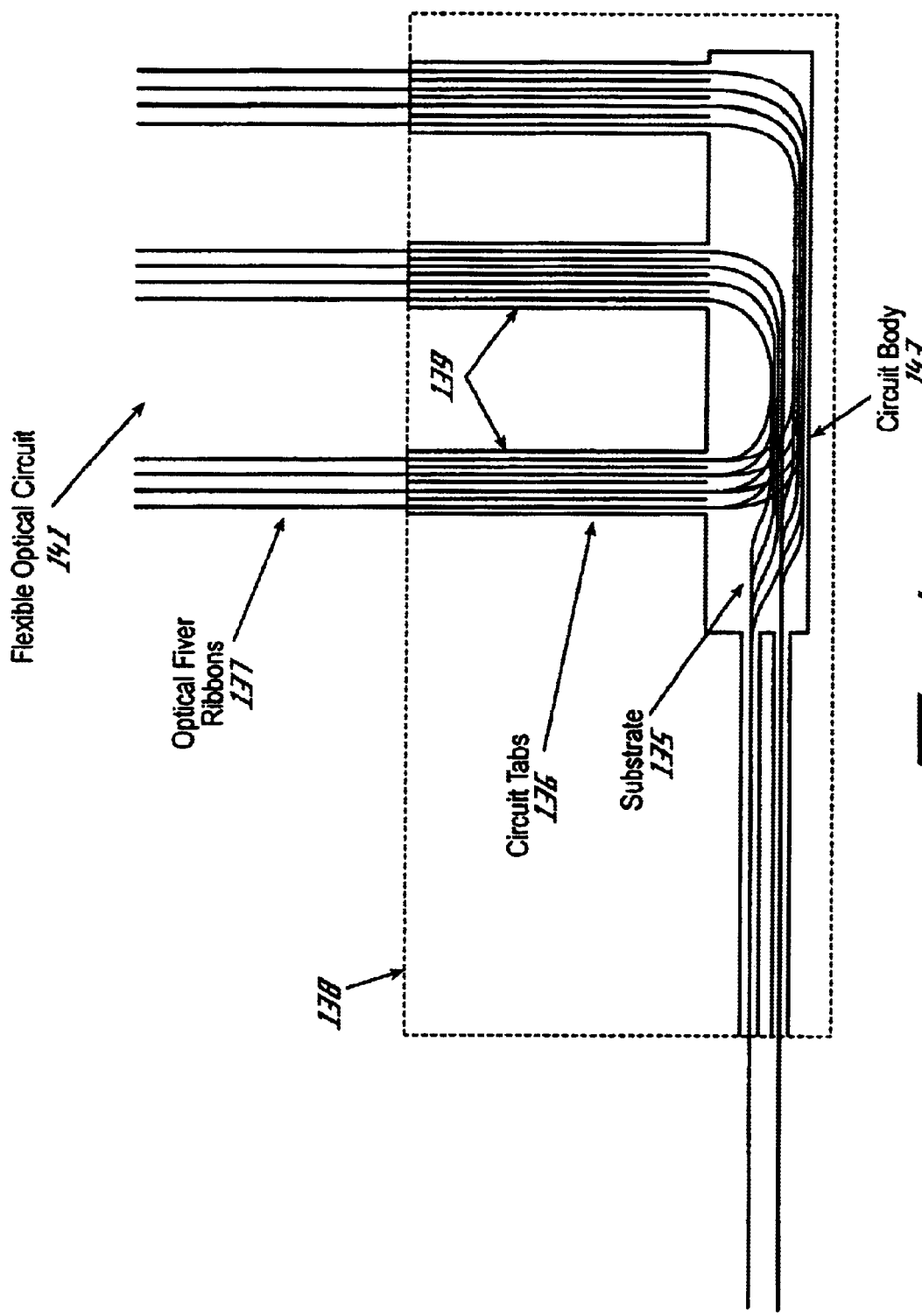
FIG. 4 shows an illustrative flexible optical fiber circuit fabricated using the system and methods of the present invention.
Figure 5:
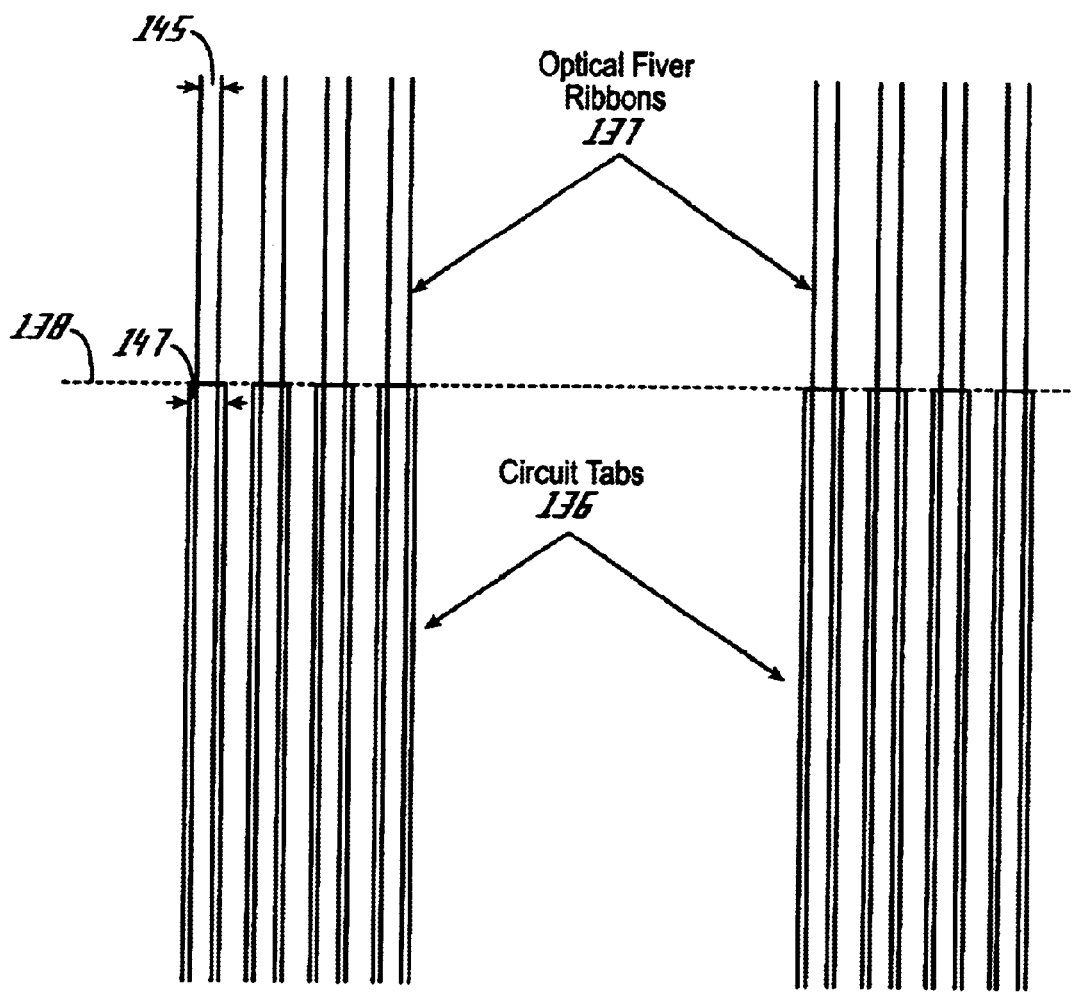
FIG. 5 shows a portion of a multi-fiber ribbon tabs of the flexible optical fiber circuit of FIG. 4.

FIG. 4 shows an illustrative flexible optical fiber circuit 141 fabricated using the system and methods of the present invention. The optical fiber circuit includes a circuit body 143, a substrate 135, circuit tabs 136 and optical fiber ribbons 137. As illustrated in FIG. 4, dashed line 138 represents a pre-cut that is preferably a perforation created prior to the routing of the optical fiber ribbons 137 because the perforation crosses the path of the optical fiber ribbons 137. The pre-cut is thus used to define the ends of the circuit tabs 136. After the pre-cut is executed, and optical fiber is routed on the substrate 135, the substrate 135 is reduced to its illustrated form by the post-cut. Therefore, prior to the post cut the substrate extends to the dashed line of the pre-cut 138 (or to the natural exterior of the substrate upon which it is formed). Therefore, the circuit tabs are formed by the post-cut, which does not cut through any optical fiber; buts cuts parallel to and lengthwise along the optical fiber. FIG. 5 shows a close-up portion of a multi-fiber ribbon tabs of the flexible optical fiber circuit of FIG. 4. As illustrated, the circuit tabs 136 are only slightly wider than the optical fiber ribbons 137 so that the optical fiber ribbons 137 aren't restricted as to their flexibility and ultimate termination points. However, this requires an exact post-cut, as the width 147 of the circuit tab 136 is only slightly wider than the width 145 of the optical fiber ribbon 137.

Therefore, in executing the post-cut file the degree to which the routing machine is offset is entered into the routing machine such that the routing machine can be corrected so that it will not cut the optical fiber ribbon. After the post-cut file is run on the test patterns, measurements are made in the X and Y directions of the test pattern to determine how far off, if at all, the routing machine is with respect to the test pattern. If, for instance, an optical fiber 50 microns in width is to be placed in the center of a circuit tab 100 microns in width, and a sample hand or electronic measurement reveals that the circuit tab extends 50 microns from one side of the optical fiber (e.g., in the X direction) and is directly underneath the edge of the other side of the optical fiber (but not extending beyond the edge), then the routing machine is adjusted 25 microns in the X direction such that additional cutting will correct the X offset and center the optical fibers in the X direction on the circuit tab. The same is done for the Y direction. Thereafter, the final shape of the flexible optical circuit can be cut, as is illustrated in FIG. 4. After the cut, the board 116 is removed so that the final product is a flexible optical fiber circuit.

Figure 6A:
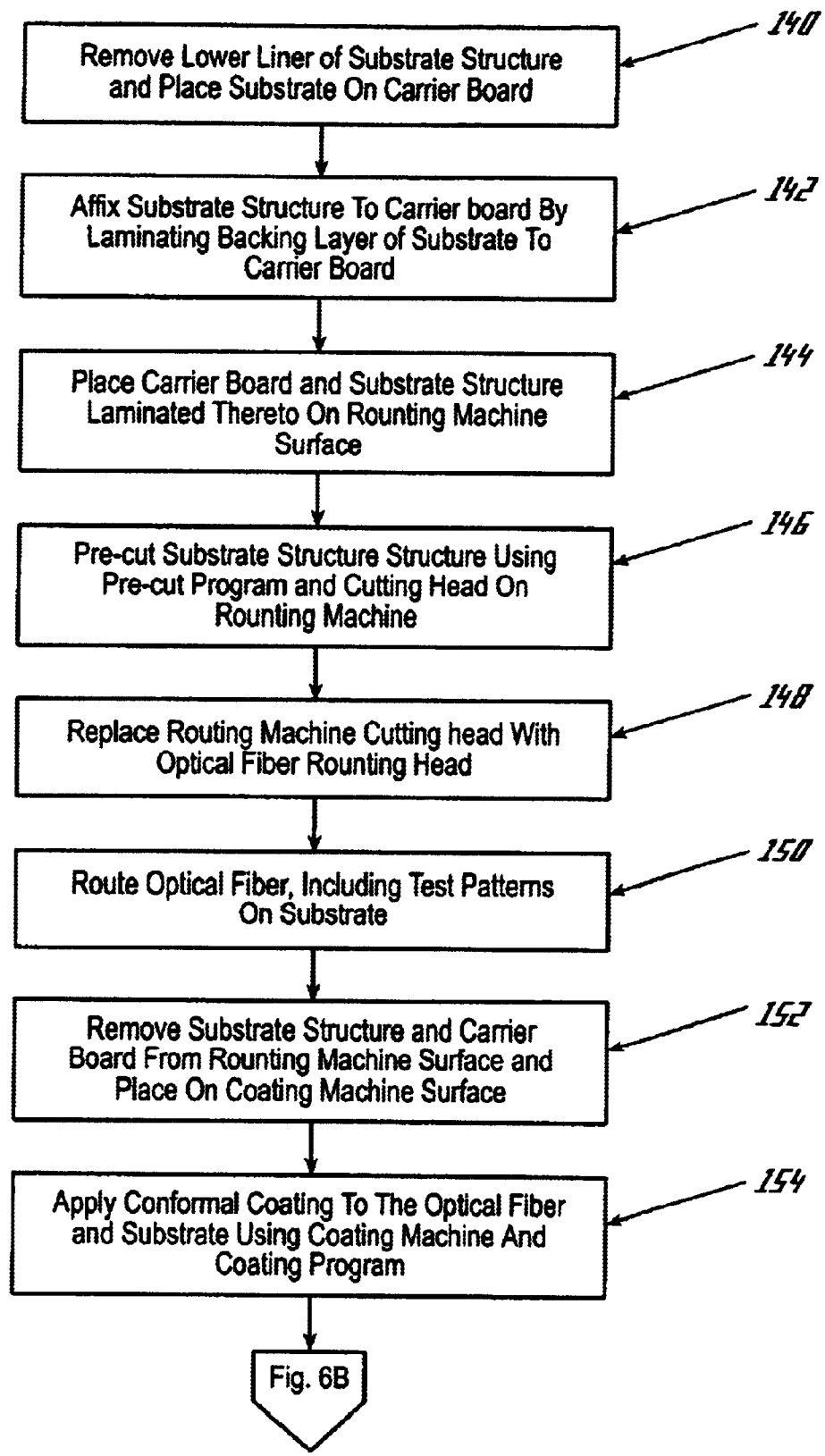
FIGS. 6A and 6B are flow charts illustrating a method for fabricating flexible optical fiber circuits, according to one embodiment of the present invention.
Figure 6B:
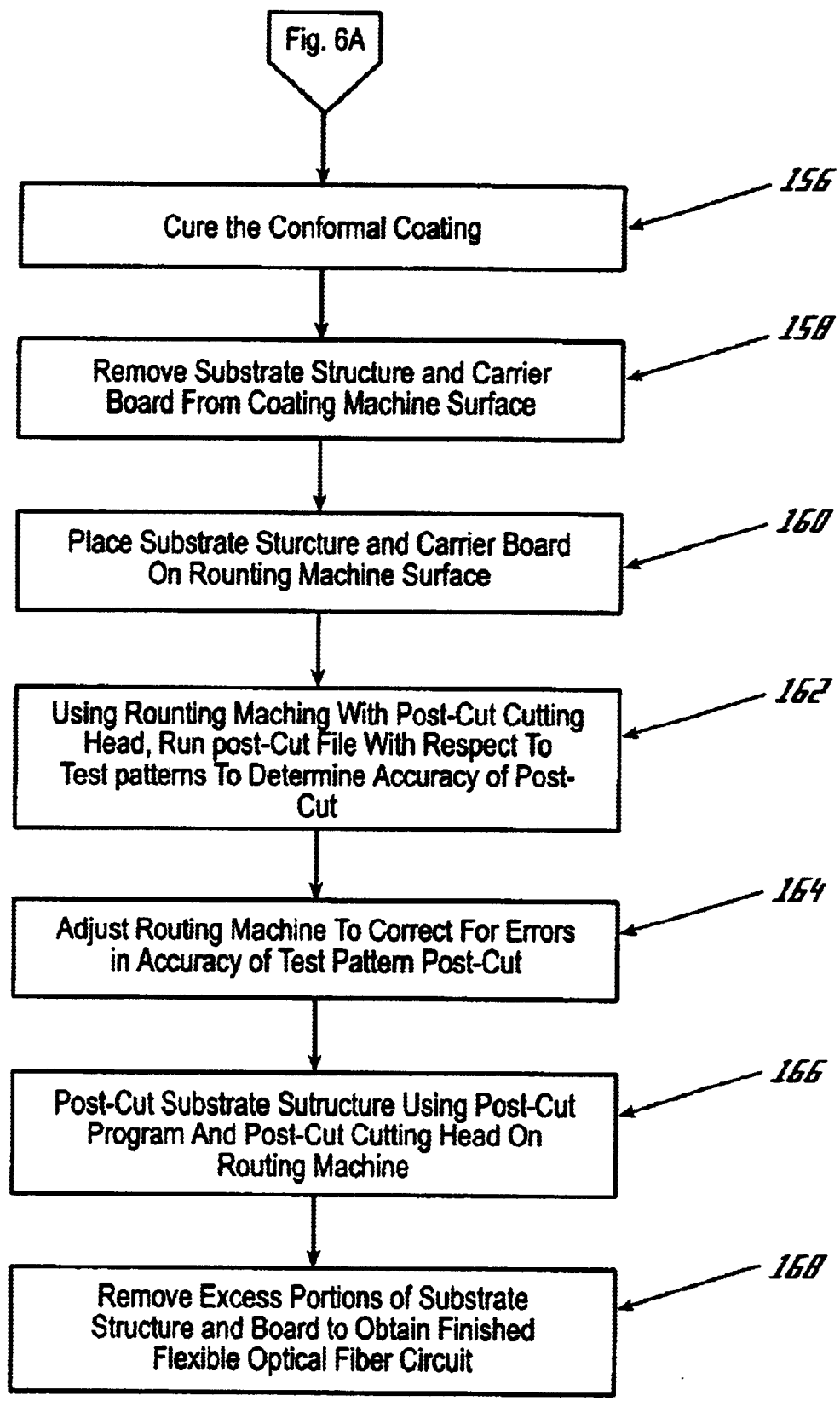

FIGS. 6A and 6B are flow charts illustrating a method for fabricating flexible optical fiber circuits, according to one embodiment of the present invention. The process begins with the removal of the lower liner of the substrate structure and the placement of the substrate structure on a carrier board (block 140). The substrate is affixed to the carrier board by laminating the backing layer of the substrate structure to the carrier board (block 142). Thereafter, the boarded substrate structure (i.e., the carrier board having the substrate structure laminated thereto) is placed on the routing machine surface (block 144), and the structure is pre-cut using a pre-cut program controlling a cutting head in place as the replaceable head of the routing machine (block 146). Optical fiber is then routed, including the optical fiber test patterns, using an optical fiber routing head and an optical fiber routing file or program (blocks 148, 150). The boarded substrate structure is then removed from the routing machine surface and placed on the coating machine surface, after which a conformal coating is applied to the optical fiber and boarded substrate structure using the coating machine guided by a coating program (blocks 152, 154).

Referring next to FIG. 6B, the conformal coating is cured (block 156) and the boarded substrate structure is removed from the coating machine surface (block 158). The structure is then placed on the routing machine surface (block 160), and the routing machine runs a cutting file, referred to as a post-cut file, with respect to the test patterns to determine the accuracy of the post-cut (block 162). The routing machine is then adjusted for errors in the accuracy of the test pattern post-cut (block 164) and the substrate structure is cut using the post-cut program and a post-cut cutting head as the replaceable head of the routing machine (block 166). Finally, the excess portions of the boarded substrate structure are removed to obtain the finished flexible optical fiber circuit (block 168).

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for fabricating flexible optical fiber circuits, comprising:
   at least one flexible substrate;
   optical fiber routed on the at least one substrate, wherein the optical fiber includes at least one non-disposable portion and at least one disposable portion, and wherein the at least one disposable portion includes at least one optical fiber test pattern;
   a routing machine, comprising a cutting tool configurable to cut the at least one flexible substrate to fabricate a flexible optical fiber circuit, wherein the at least one routing machine utilizes the at least one optical fiber test pattern to align the cutting tool with respect to the at least one non-disposable portion of the optical fiber.

2. The system of claim 1, wherein the system further comprises at least one aligning post for aligning the at least one flexible substrate with respect to the routing machine.

3. The system of claim 1, wherein the routing machine further comprises a control unit, wherein the control unit automates the movement of the cutting tool.

4. The system of claim 1, wherein the optical fiber test pattern is continuous with the at least one non-disposable portion.

5. A method for fabricating flexible optical fiber circuits, comprising:
   routing optical fiber on a flexible substrate according to a pattern using an optical fiber routing head, wherein routing the optical fiber includes routing at least one non-disposable optical fiber portion and at least one disposable optical fiber portion including at least one test pattern; and
   aligning a cutting head to cut adjacent at least one segment of the non-disposable optical fiber portion, wherein aligning the cutting tool is based upon the accuracy with which the cutting head cuts adjacent to the disposable optical fiber portion.

6. The method of claim 5, further comprising cutting adjacent the non-disposable optical fiber portion to fabricate the flexible optical fiber circuit.

7. The method of claim 5, further comprising providing an adhesive on a surface of the flexible substrate prior to routing the optical fiber on the substrate.

8. The method of claim 5, wherein the at least one disposable optical fiber portion comprises at least one test pattern.

9. The method of claim 5, wherein the at least one disposable optical fiber portion is continuous with respect to the at least one non-disposable optical fiber portion.

10. The method of claim 1, further comprising perforating the flexible substrate prior to routing optical fiber on the flexible substrate.

11. The method of claim 5, further comprising coating the optical fiber on the flexible substrate using a conformal coating.

* * * * *